United States Patent [19]

Hook et al.

[11] Patent Number: 4,785,461
[45] Date of Patent: Nov. 15, 1988

[54] PREMIXED COLD REACTION CW LASER NOZZLE

[75] Inventors: Dale L. Hook, Rancho Palos Verdes; James E. Broadwell, Los Angeles, both of Calif.

[73] Assignee: The United States of America as represented by the Secretary of the Air Force, Washington, D.C.

[21] Appl. No.: 11,084

[22] Filed: Feb. 5, 1987

[51] Int. Cl.⁴ .................................... H01S 3/095
[52] U.S. Cl. ........................ 372/89; 372/58; 372/59; 372/90
[58] Field of Search ............. 372/89, 90, 59, 58, 372/55; 378/92, 69

[56] References Cited

U.S. PATENT DOCUMENTS

| | | | |
|---|---|---|---|
| 3,760,294 | 9/1973 | Roberts et al. | 331/94.5 |
| 3,832,650 | 8/1974 | Roberts | 372/90 |
| 3,918,800 | 11/1975 | Griffin | 372/90 |
| 4,048,586 | 9/1977 | Witte et al. | 331/94.5 D |
| 4,236,123 | 11/1980 | Richardson et al. | 372/89 |
| 4,237,429 | 12/1980 | Hook et al. | 372/89 |
| 4,290,031 | 9/1981 | Carroll et al. | 372/90 |
| 4,290,032 | 9/1981 | Vogel et al. | 372/90 |
| 4,307,842 | 12/1981 | Morris | 372/89 |
| 4,320,358 | 3/1982 | Heidmann et al. | 372/90 |
| 4,348,764 | 9/1982 | Cavalleri et al. | 372/89 |
| 4,375,687 | 3/1983 | Hook et al. | 372/58 |
| 4,453,914 | 6/1984 | Huniu et al. | 372/89 |
| 4,650,416 | 3/1987 | Warren, Jr. et al. | 372/89 |

*Primary Examiner*—Leon Scott, Jr.
*Attorney, Agent, or Firm*—Stanton E. Collier; Donald J. Singer

[57] ABSTRACT

The premixed cold reaction CW chemical laser places the secondary injectors which input fuel and/or diluent in the exit walls of the primary nozzle. These injectors are acutely angled thereto and are arranged in rows and are further grouped therein where a first injector inputs a pure diluent, a second group of injectors inputs independently of a third group.

2 Claims, 3 Drawing Sheets

PREMIXED COLD REACTION CW LASER NOZZLE

STATEMENT OF GOVERNMENT INTEREST

The invention described herein may be manufactured and used by or for the Government for governmental purposes without the payment of any royalty thereon.

BACKGROUND OF THE INVENTION

The present invention relates to lasers, and, in particular, to chemical laser devices which operated with a plenum chamber which is provided with gases which are heated by combustion or other means to produce atomic or free radical species. For example, $F_2$ is heated to give F-atoms. Diluent gases such as He or $N_2$ are also added and heated in the plenum. Following the combustor plenum, the gases are expanded through a supersonic primary nozzle to a high velocity and low pressure. The gases exit this nozzle to a lasing cavity. $H_2$ and $D_2$ gases, for example, are injected into the cavity and mixed with the expanded F-containing free jet. The reaction with F-atoms initiates the chemical pumping mechanism which yields vibrationally excited HF or DF. Mirrors are placed about the cavity and lasing results from the vibrationally excited HF or DF. The gases are then pumped to a pressure such that atmospheric exhaust is possible.

Aerodynamic considerations dictate the dimensions of the primary nozzle and together with the high plenum temperatures required for lasing operation give rise to severe viscous effects in the supersonic primary nozzle. With He as a diluent and combustor plenum temperatures in excess of 1000° K., it has been found that the flow exiting from the primary nozzles of working devices is totally viscous, i.e., the influence of the wall drag is distributed throughout the jet flow. The detrimental aspects of the viscous flow are a loss in total pressure, a decrease in the gas exit velocity and an increase in gas exit temperature, i.e., a decrease in Mach number. The attendant decrease in initial Mach number of the reacting streams dictates large quantities of diluent gases be included to prevent thermal choking of the flow in the presence of heat addition. Loss of total pressure and increased diluent ratios give rise to increased pumping requirements. Either a decrease in gas velocity or an increase in gas exit temperature lead to a reduction in the length of the gain supporting laser region with consequent degradation of laser beam coherence and increased mirror loading.

An improved CW chemical laser causes the gas flow to become supersonic before it enters the region of the $H_2$ or $D_2$ injector tubes. Because the supersonic flow is brought about in a large nozzle, viscous effects in producing the supersonic flows are minimized. Wedge shaped devices used for the $H_2$ or $D_2$ injectors do, however, create both viscous drag and wave losses because the wedge shaped devices are located downstream of the primary nozzles and in the supersonic gas flow. The net results is that the lasing efficiency is less than 50% of the theoritically achievable efficiency.

Therefore, it can be clearly seen that there is a need for a better nozzle arrangement for introducing the free radical species with the secondary gases of $D_2$ or $H_2$.

SUMMARY OF THE INVENTION

The present invention sets forth a CW chemical laser having a premixing section substantially within the primary nozzle to increase efficiency and further reduces viscous effects resulting from secondary injectors being positioned in wedges in the gas flow path.

The present invention is directed at the placement of the secondary injectors which input fuel and/or diluent into the primary nozzle from the exit walls. These injectors are angled such that the secondary jets from the injectors mix with the primary jet from the primary nozzle to form a premixed mixture that lases upon initiation by a bow shock.

It is therefore one object of the present invention to provide a combustor for a CW chemical laser wherein the secondary gases are input from a row of supersonic axisymmetric nozzles positioned at an acute angle in the primary nozzle wall;

It is therefore another object of the present invention to provide a set of secondary injectors that input a diluent prior to the secondary injectors that input a fuel such as $H_2$ or $D_2$ to prevent local reactions behind the initial injection shock wave.

It is therefore another object of the present invention to provide a CW chemical laser that cold premixes the gases before lasing action; and It is therefore another object of the present invention to provide a CW chemical laser that causes initiation of the unreacted mixture using a shock wave.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
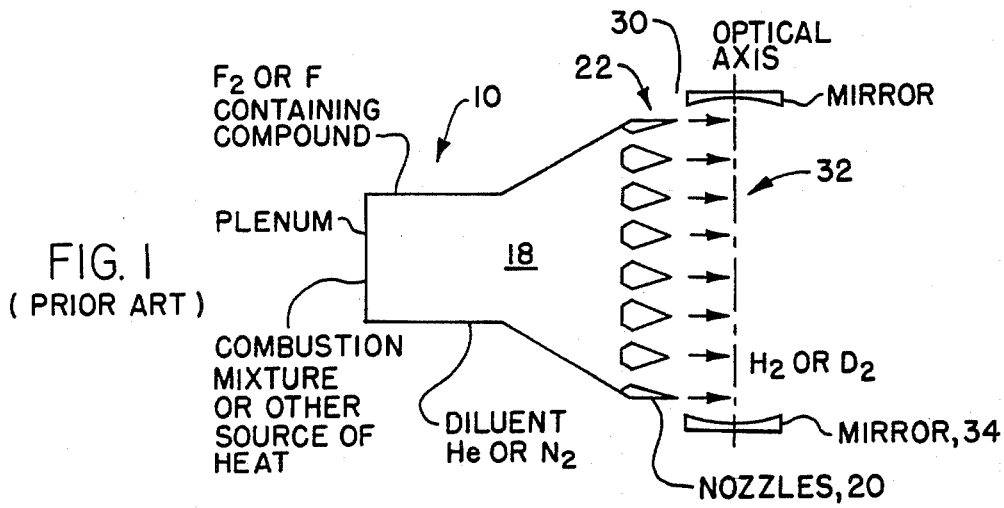
FIG. 1 is a schematic illustration of a chemical laser nozzle arrangement that is used in the prior art.
Figure 5:
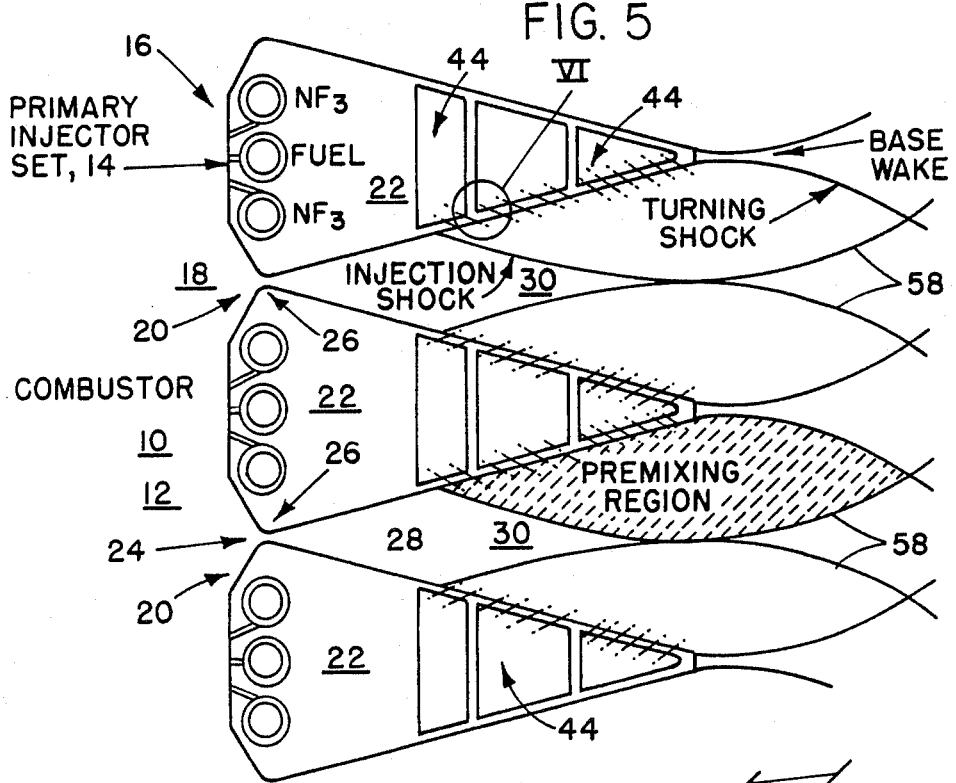
FIG. 5 is a cross section through a premixed chemical laser nozzle of the present invention.
Figure 6:
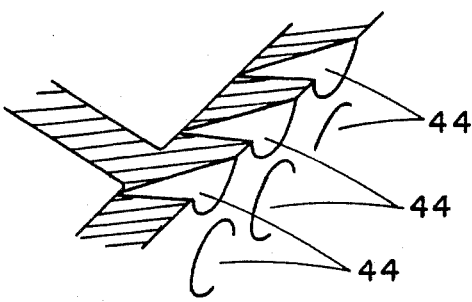
FIG. 6 is a partial cross section of the secondary injectors of FIG. 5.

Referring to FIGS. 1 and 5, a combustor 10 is schematically shown wherein an oxidizer such as $NF_3$ or $F_2$ and a fuel are input into a combustion camber 12 by a plurality of primary injector sets 14 being, in the Figures, a triplet of orifices 16. A diluent, not shown, may be mixed with either oxidizer or fuel or be input by itself as the case may be. These reactants form a combustion mixture which reacts in combustion chamber 12 to form reaction products, in particular, atomic fluorine. The reaction products form a heated primary gas 18. As a result of increased pressure in combustion chamber 12 primary gas 18 is forced past a plurality of primary nozzles 20 being formed, for example, by primary rings as noted in U.S. Pat. No. 4,453,914 which is incorporated by reference and in patent application entitled "$NF_3$ Combustor" having Ser. No. 796,125 being allowed which is also incorporated by reference or vertical wedges as shown in U.S. Pat. No. 4,375,687 which is also incorporated by reference.

Referring in particular to FIG. 5, two primary nozzles 20 are shown. Three wedge shaped structures 22 form the two primary nozzles 20. Each nozzle 20 has an input section 24, a throat section 26, and an output section 28. In combination, these form a supersonic primary nozzle 20 for heated primary gas 18.

Figure 2:
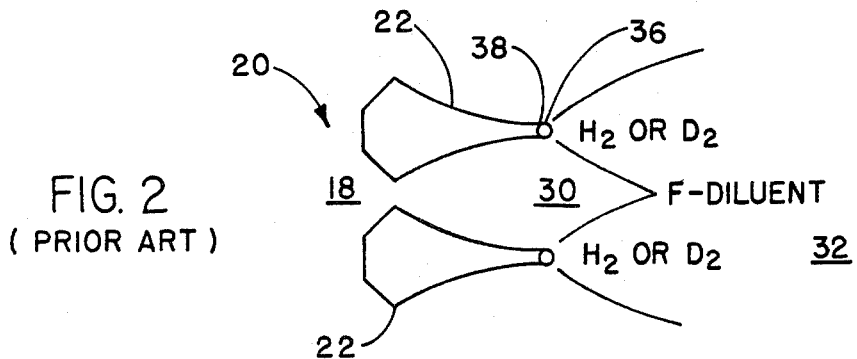
FIG. 2 is an enlarged partial view of the nozzle structure of FIG. 1.

As shown in FIG. 1, heated primary gas 18 flows through wedge structures 22 forming a plurality of supersonic primary nozzles 20 which cause heated primary gas 18 to become a supersonic gas 30. Thereafter, additional fuel and diluent are added to form a lasing gas 32. A conventional laser mirror system 34 outputs the laser energy formed by HF or DF in the above example. FIG. 2 illustrates schematically the input of additional fuel from secondary injectors 36 located on wedge structure 22 at the acute end 38 thereof. U.S. Pat. No. 4,375,687 illustrates this configuration and a further embodiment wherein the secondary injectors are located in vanes used for initiating laser action.

The present invention provides a low temperature/reduced kinetics rate approach to the achievement of maximum efficiency. That is, the supersonic gas 30 is injected at such a low temperature that no reaction occurs until significant mixing has been achieved. A reaction initiator 40, see FIG. 3, consisting of an array of small angle wedge vanes 42 has in the past been placed at the optimum location in a flow field to "trigger" the reaction through a series of weak oblique shocks, see FIG. 4. As noted above, wedge vanes 42 placed in the supersonic flow field create viscous effects that are detrimental to maximum efficiency.

Figure 3:
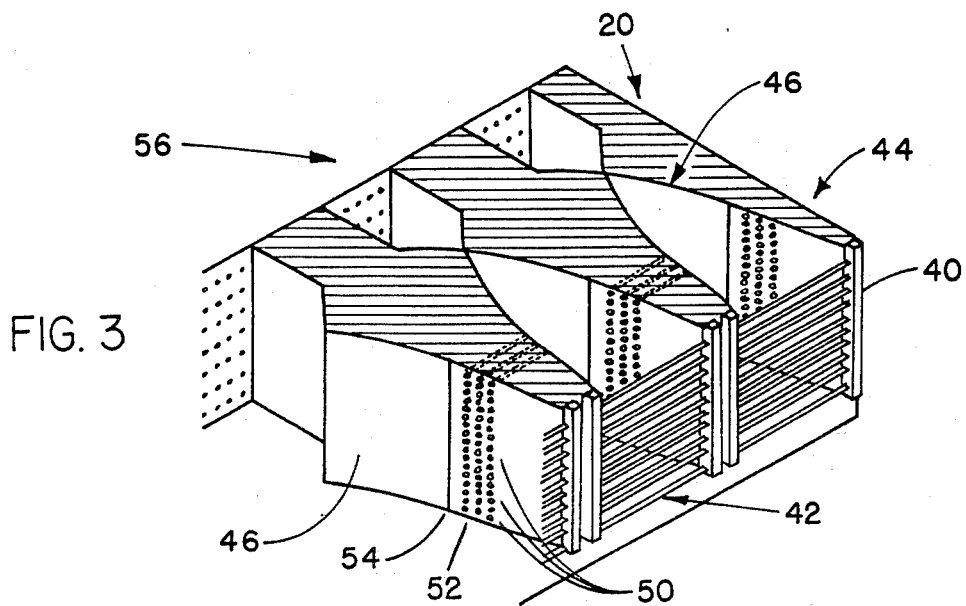
FIG. 3 is a perspective view of a premixed chemical laser nozzle of the present invention.
Figure 4:
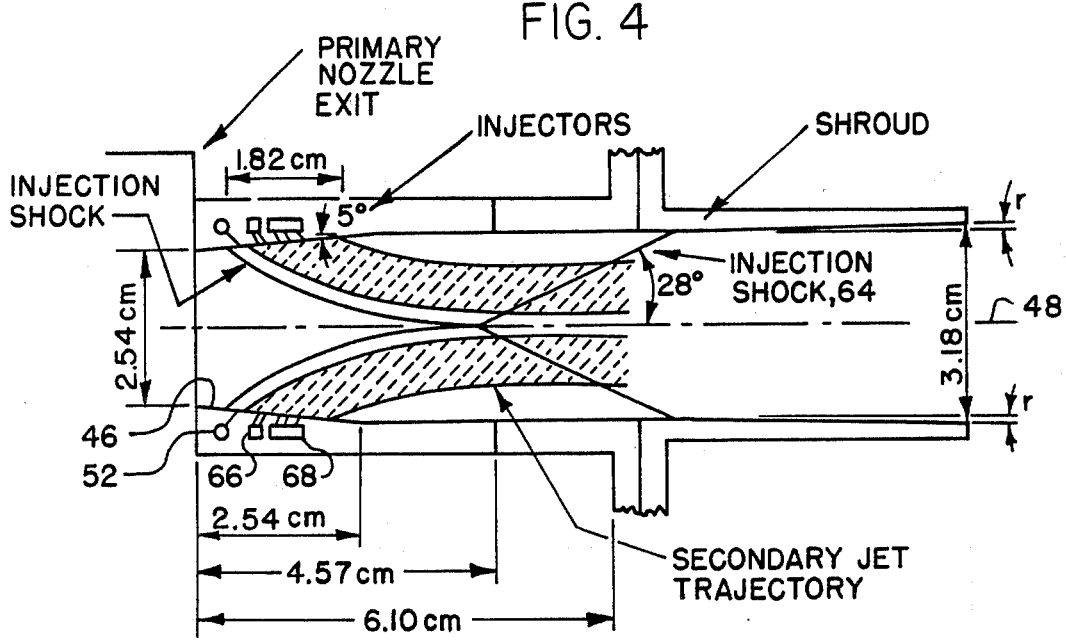
FIG. 4 illustrates the flow field in the laser of FIG. 3.

The present invention eliminates reaction initiator 40 by placing secondary injectors 44 in the sidewalls 46 of primary nozzles 20. The jets from secondary injectors 44 are supersonic and injected at a shallow angle such that penetration to a centerline 48, FIG. 4, is achieved with a minimum drag loss to supersonic gas 30. By arranging a series of jets in a plurality of rows 50 in the streamwise dimension, as shown in FIG. 3, the required volume of gas can be injected with minimum disturbance and shock strength. By injecting only a diluent such as in a first jet 52 of each row 50 which is located directly behind the bow shock initiation line 54, FIG. 3, in the hotest region of the flow, exposure of supersonic gas 30 to the local high temperature is avoided. The mixing scale is determined by the number of rows of jets and the spacing between the rows. Since the penetration of the jet into the primary stream is proportional to the jet mass flow to the one-third power, it is possible to increase the number of rows 50 with little effect on the penetration height for a fixed mass flow. Thus for a fixed secondary injection flow rate the characteristic mixing dimensions can be decreased without an attendant increase in the drag losses.

The premixed cold reaction CW chemical laser 56 of FIG. 3 allows for a mixing section 58, FIG. 5, downstream of the secondary injectors 44 internal to primary nozzles 20. It has been found that a mixing length of about 3 cm is adequate to achieve significant mixing of the reactants prior to initiation. This length is short relative to that for pure laminar diffusion (100 to 200 cm for the pressures and lateral distances involved). The increased mixing rate comes from the vorticity created by the normal component of the jet in the cross flowing primary stream. Laser 56 has been determined to provide a superior mixing arrangement for other supersonic mixing requirements as well.

A prototype laser injected the secondary fuel and helium mixture at a 30 degree angle from side 46. This prototype laser had three jets in a row, the first jet discharging pure helium. Experiments have demonstrated that the two streams, one from the primary nozzle and the other one from the secondary injectors, could be at least partially mixed without significant reaction and that these flows could be triggered by a weak oblique shock. The 30 degree jets of secondary injectors 44 appeared to deposit the fuel in a rather tightly confined region away from surface 46.

Figure 7:
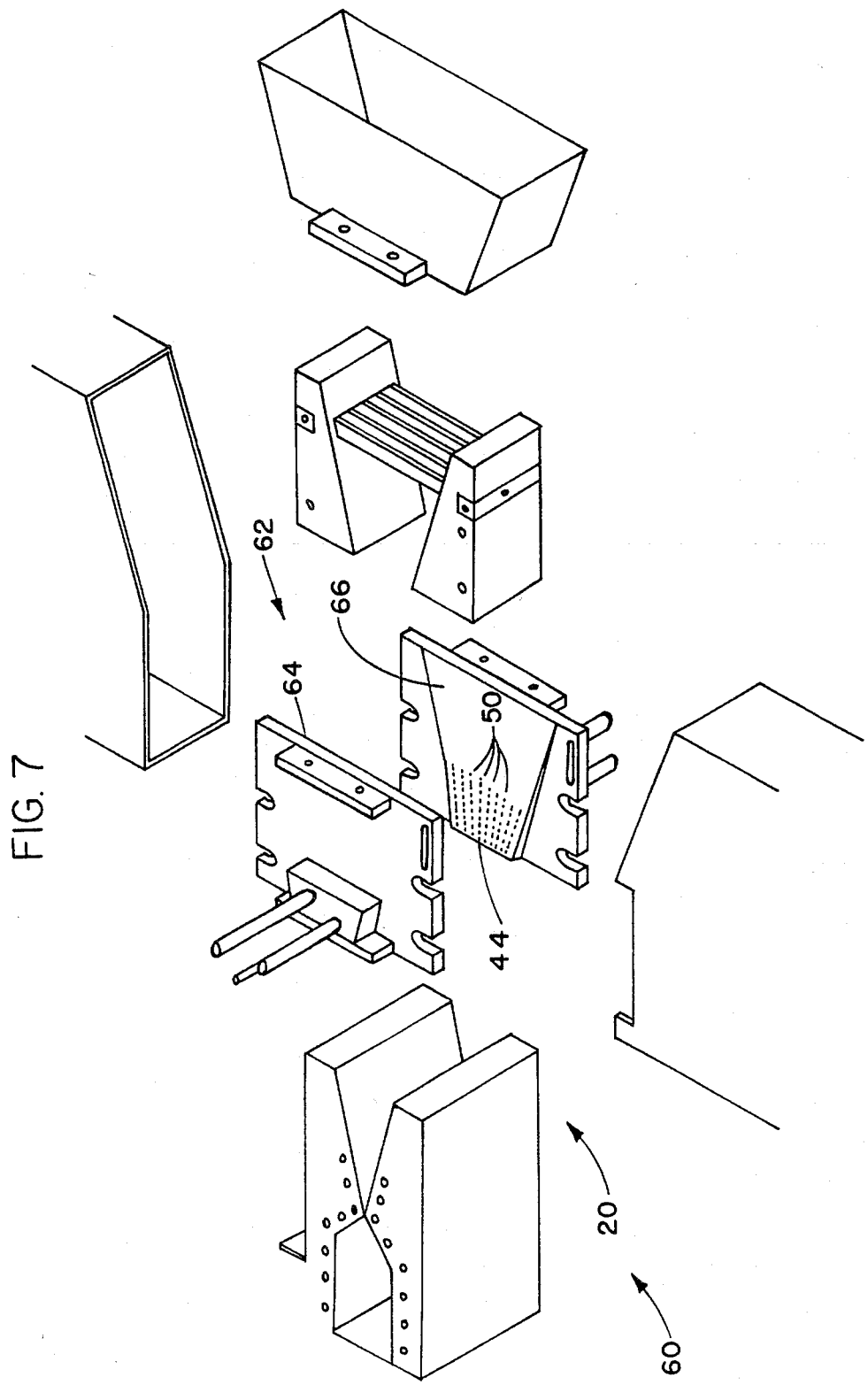
FIG. 7 is another embodiment of the present invention within a laser.

A premixed cold reaction laser 60 is shown in FIG. 7 wherein the secondary injector section 62 is rotated 90 degrees from that shown in FIG. 3 and separated from nozzle wall 46. The fuel and helium mixtures are injected from the top and bottom surfaces 64 and 66, respectively, of primary nozzle 20. The primary nozzle is 2.5 cm in height so that the penetration distance to centerline is 1.25 cm. The injector pattern includes six holes per row 50.

The reaction initiator 40, not shown in FIG. 7, was rotated 90 deg so that the oblique shock waves and their effects on the reaction could be observed. The initiator 40 can be readily adjusted from 2.5 to 4 cm downstream of the injection ports or removed completely. Measurements of the cavity fuel and DF gain spatial distribution for this configuration show a somewhat improved uniformity (in the plane normal to the injector surface) when compared to other wedge results. Much of the nonuniformity problem existed, however, because the cavity fuel failed to cover the entire height of the primary flow stream.

Although nonuniformity problems did exist, nonetheless, two significant results were achieved from tests of laser 60. These were: using an injection configuration that incorporates 17 rows 50 of secondary injectors 44 (each row 50 containing 6 injectors 44), gain and power results within 75% of the baseline were achieved. This was accomplished without any reaction initiator 40. In this case the secondary injection bow shock 64 is sufficiently strong to trigger reaction when it crosses the mixing region 3 to 7 cm downstream of the first point of injection. This is shown schematically by FIG. 4.

In FIG. 7, the 30° angled secondary injectors 44 have been installed in the walls 64 and 66 of the 2.54 cm high primary nozzle 20. The first jet 52 in each row 50 of six is located at the Mach 6 station in nozzle 20.

Each row 50 consists of six injectors aligned along the streamlines of the primary nozzle 20. The manifolding for the secondary injectors 44 is such that the first nozzle 54 in each row 50 can be supplied with pure helium. The next two nozzles, see FIG. 4, form a group 66 of injectors that operate independently of a second group 68. In each row group 66 is fed by an independent feed circuit such that the content of $D_2$ and/or the stagnation pressure can be varied from that of the last three nozzles, group 68, in each row.

Clearly, many modifications and variations of the present invention are possible in light of the above teachings and it is therefore understood, that within the inventive scope of the inventive concept, the invention may be practiced otherwise than specifically claimed.

What is claimed is:

1. A combustor for a premixed cold reaction CW chemical laser, said combustor comprising:

a combustion chamber, said combustion chamber containing reaction products forming heated primary gas having therein atomic species of an oxidizer, said combustion chamber directing said reaction products to an output plenum;

a plurality of wedges positioned downstream of said output plenum to form a plurality of primary nozzles, each of said primary nozzles having an input section, a throat section, and an output section, said sections forming a supersonic nozzle to output said reaction products as a supersonic gas;

a plurality of secondary injectors having supersonic jets therefrom, said secondary injectors being located on exit walls substantially parallel to the streamlines of said primary nozzles and located downstream of said throat section of said primary nozzles, said secondary injectors being arranged in substantially parallel rows in a streamwise direction, each of said rows having a plurality of said secondary injectors therein, said plurality of secondary injectors in a row comprising a plurality of groups of secondary injectors, a first group being proximal to said throat section and injecting a diluent, a second group of secondary injectors downstream of said first group and inputting a fuel therein, said secondary injectors being at an acute angle to said exit walls, said acuteness being in the downstream direction, said supersonic gas and selected products from said secondary injectors mixing in a cold reaction to from a pre-lasing product, lasing of said pre-lasing products being trigger by a bow shock resulting from the interaction of said supersonic gases from said primary nozzle and the supersonic gases from said secondary injectors in said exit walls, and means for inputting to said combustion chamber and said secondary injectors chemicals necessary to produce lasing action.

2. A combustor as defined in claim 1 wherein the number of injectors per said row is six and said injectors are angled at about 30° to said exit walls.

* * * * *